June 27, 1967 R. D. COLINET 3,327,544
VARIABLE SPEED TRANSMISSION
Filed Feb. 19, 1965 7 Sheets-Sheet 4
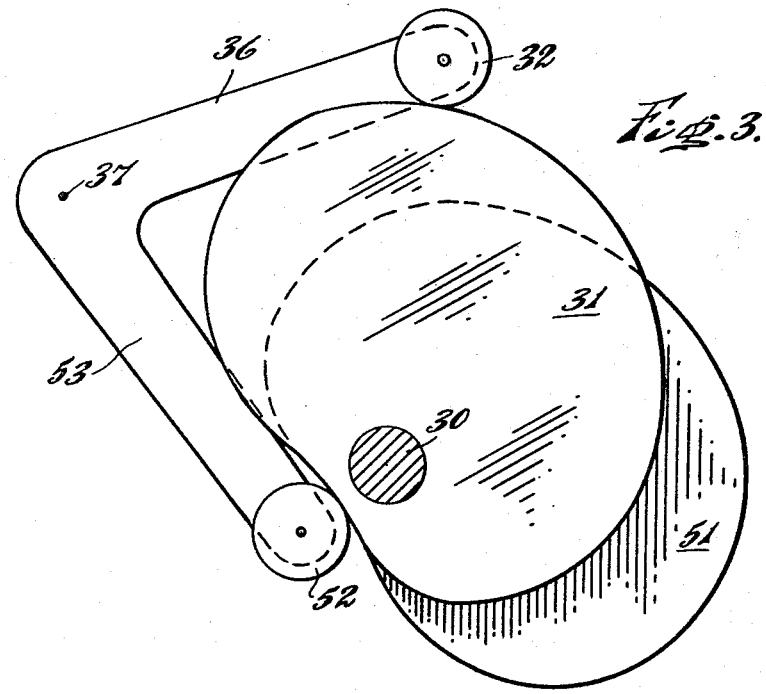
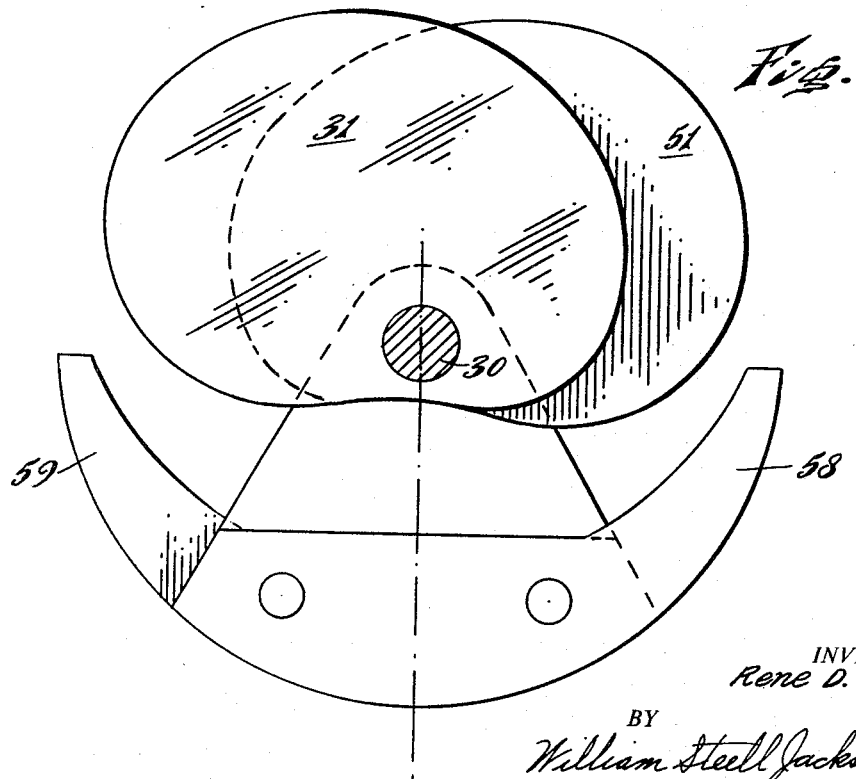
INVENTOR.
Rene D. Colinet
BY
William Steell Jackson and Sons
ATTORNEYS June 27, 1967  R. D. COLINET  3,327,544
VARIABLE SPEED TRANSMISSION
Filed Feb. 19, 1965  7 Sheets-Sheet 6
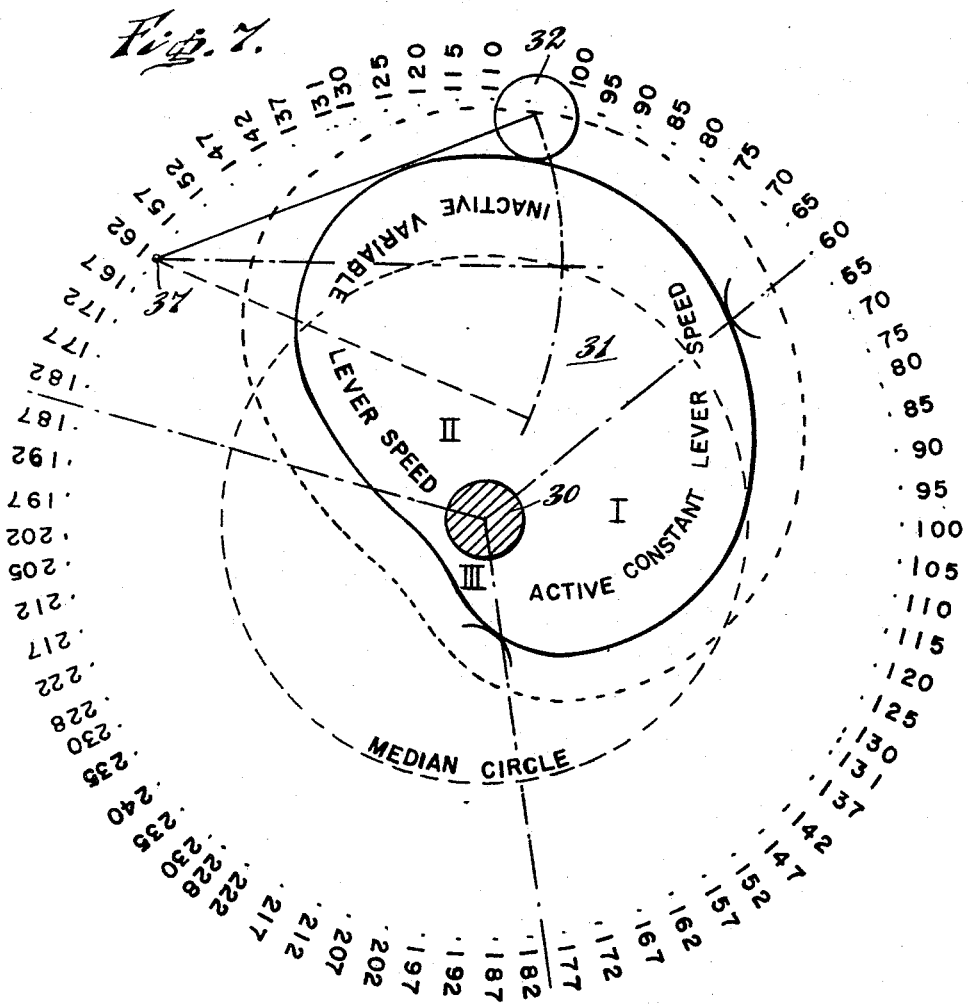
INVENTOR.
Rene D. Colinet
BY
William Steell Jackson and Sons
ATTORNEYS

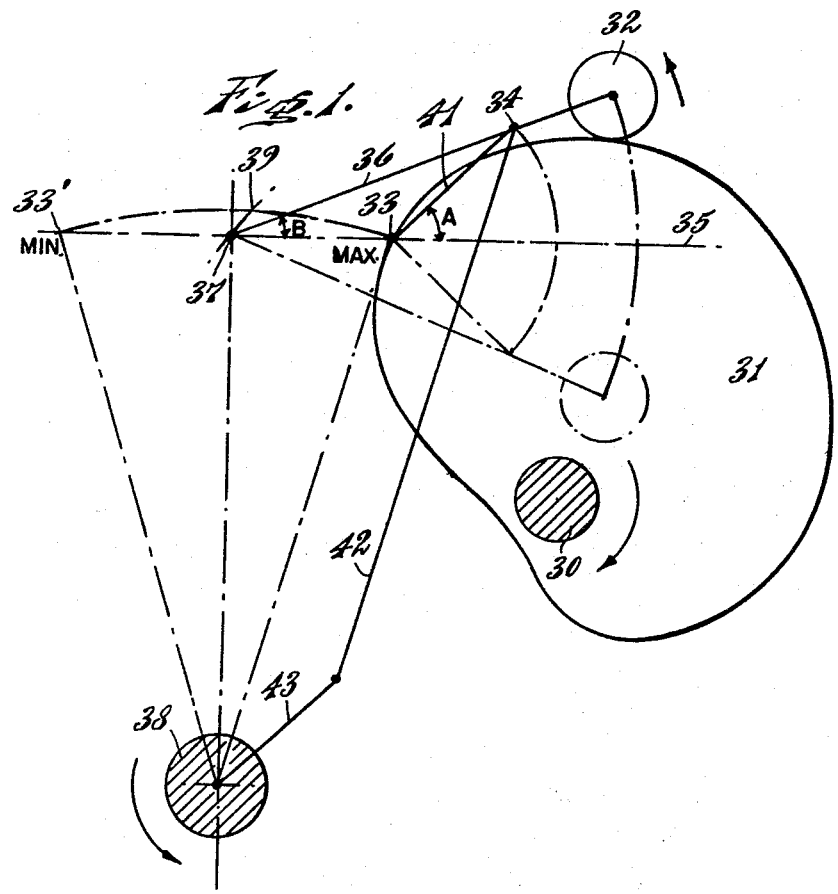

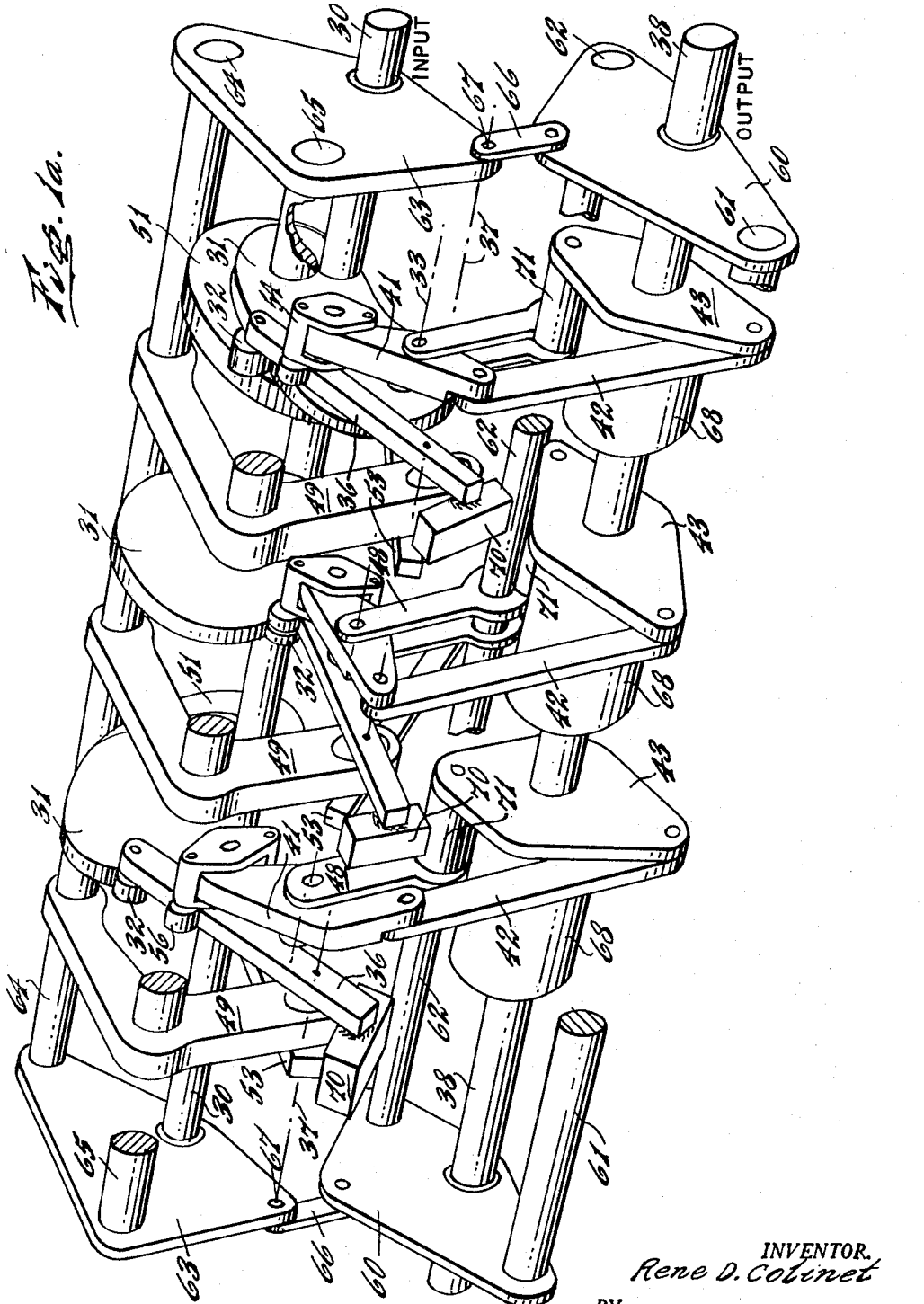

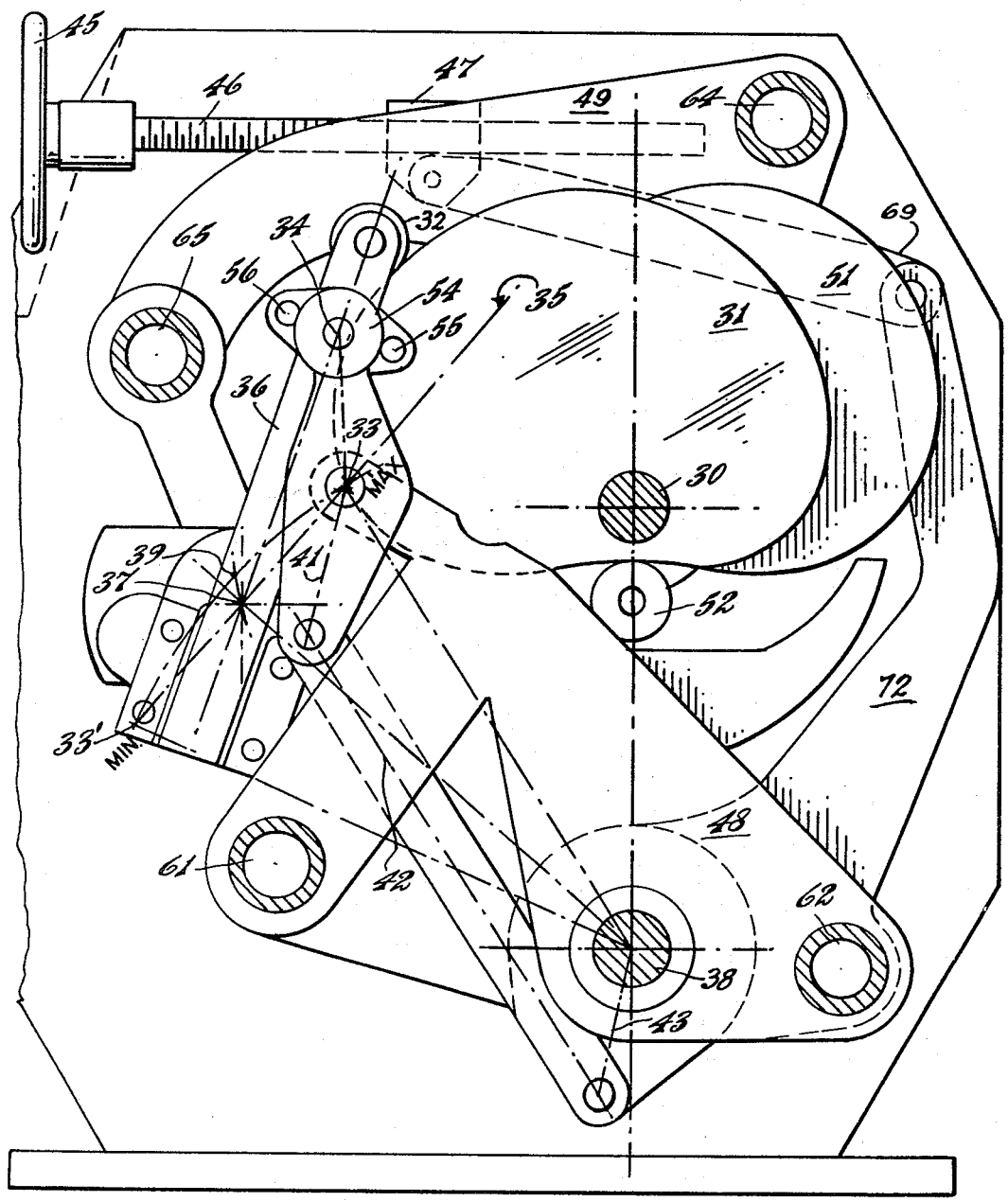

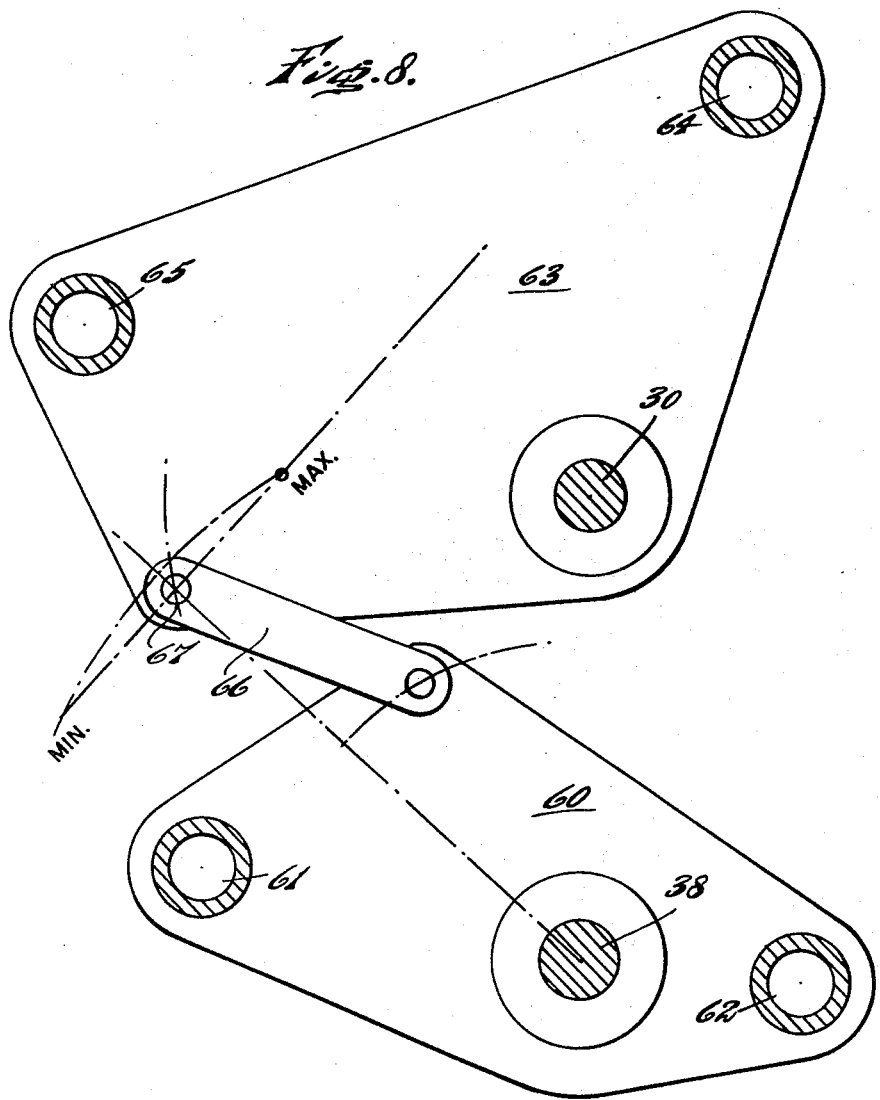

Patent 3,327,544 — Variable Speed Transmission

3,327,544
VARIABLE SPEED TRANSMISSION
Rene D. Colinet, Philadelphia, Pa., assignor to La Soudure Electrique Autogene, S.A., Brussels, Belgium, a corporation of Belgium
Filed Feb. 19, 1965, Ser. No. 433,941
4 Claims. (Cl. 74—125)

The present invention relates to improvements in variable speed transmission and speed reduction mechanisms of the type described and claimed in U.S. Patent 2,929,255, granted to the present inventor on Mar. 22, 1960.

These mechanisms are capable of changing one constant angular speed into another constant but different angular speed over a range between zero and a maximum. This is accomplished by superimposing and combining the reciprocating or oscillating motions produced by these mechanisms and using such motions to operate a series of one-way clutches on a common output shaft to achieve a continuous or constant angular motion.

An object of this invention is to further simplify the design and construction of the mechanism as claimed in the above mentioned patent by utilizing a lesser number of movable parts thereby increasing the efficiency and the maximum output speed obtainable from a given input speed.

A further object is to increase the power rating of the device without increasing its weight or size by affording higher operational speeds for a given output torque.

An additional object of this invention is to eliminate the inertia effects created by static and dynamic unbalance in the oscillating parts of the prior art devices which made them inoperable at high speeds.

The objects of this invention are accomplished by mounting a cam on the input shaft having a cam follower associated therewith instead of revolving a crank about a point, which point describes a circular motion with respect to the axis of the input shaft, to create the necessary oscillatory motion. By using a cam the mechanism can be dynamically balanced thereby eliminating the vibrations which were created in the prior art revolving crank design.

To create constant angular speed of an output shaft three of these mechanisms are mounted on an input shaft 120 degrees out of phase with each other; each mechanism transmitting motion to the output shaft during successive one-third revolutions of the input shaft. The cams are designed so that during one-third of their revolution they will impart constant angular speed in one direction to the output shaft by activating one-way clutches associated therewith. By utilizing cams, instead of revolving cranks, the two nonfunctioning cams during any one-third revolution of the input shaft can be constructed so as to impart identical accelerations to their mechanisms in opposite directions. When one of the non-functioning cams is imparting maximum acceleration to its mechanism in one direction the other is imparting maximum acceleration to its mechanism in the other direction. Thus all extraneous inertia is cancelled out leaving only the positive constant motion being generated by the functioning cam during its particular one-third revolution. This enables the system to eliminate whiplash which occurred in the prior art device for in those devices when one mechanism whiplashed during the return stroke, the other two mechanisms were not experiencing such motions since they were dephased and thus one could not be used to compensate the other. Here when one non-functioning mechanism is accelerating on the return stroke, the other non-functioning is accelerating exactly opposite thereto thus cancelling out any inertia which may develop.

In the drawings I have chosen to illustrate a few only of the numerous embodiments in which my invention may appear, selecting the form shown from the standpoint of convenience in illustration, satisfactory operation and clear demonstration of the principles involved.

FIGURE 1 is a schematic view of the invention showing the cam operation and basic linkage mechanisms for one of the motion transmitting devices.

FIGURE 1a is an exploded perspective view of the device of the invention.

FIGURE 2 is a diagrammatic view of the preferred embodiment of the invention.

FIGURE 3 is a fragmentary diagrammatic view of the cam and a counter-cam for keeping the cam follower in constant contact with the cam.

FIGURE 4 is a fragmentary diagrammatic view showing the relationship of suitable counter weights to statically balance the cam and counter-cam.

FIGURE 7 is a view illustrating the method of determining the desired profile of the cam.

FIGURE 8 is a fragmentary diagrammatic view showing the means for keeping the pivot point of the cam follower lever in proper relationship to the input and output shafts as the mechanism is adjusted between maximum and minimum transmission speeds.

Figure 5:
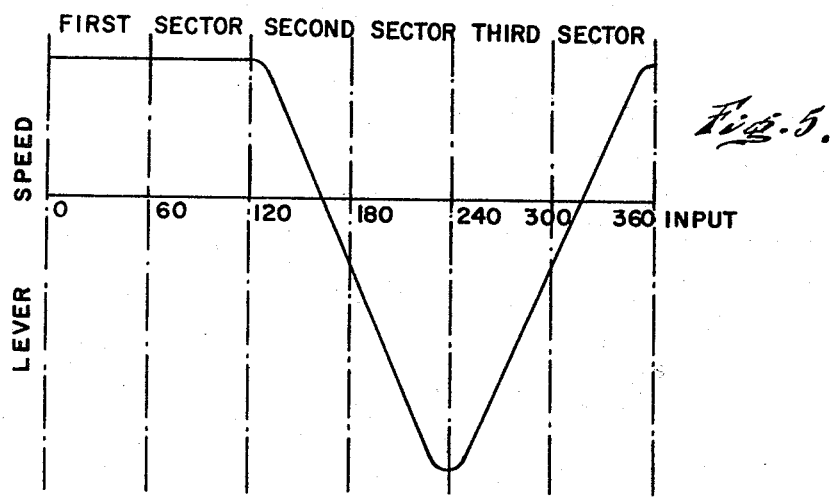
FIGURE 5 is a plot of the angular speed of the cam follower lever against the degrees of revolution of the input shaft.

Referring now to the figures and in particular FIGURE 1 and FIGURE 1a, motion is transmitted through an input shaft 30 upon which is mounted a cam 31 which rotates in a clockwise direction. Riding on the cam is a cam follower 32 which is mounted on a lever 36 which lever pivots around point 37. The cam is shown in position of maximum radius with the cam lever at the uppermost point of its oscillation. The cam revolves about the axis of the input shaft 30 and when it reaches its smallest radius, the lever and follower are at their lowest position as shown in phantom in FIGURE 1.

Slidably mounted on the lever 36 is an arm 41 which pivots around point 33. In this view the arm is shown at position 34 on lever 36. As will be hereinafter explained, the cam is so constructed that it will give a constant angular velocity to the lever 36 during one-third revolution of the input shaft and attached cam. The lever is positioned in this form of the invention so that it will rotate through an angle 30 degrees at a constant angular velocity for the appropriate 120 degrees of revolution of the cam. The lever, however, could be so constructed so as to give any ratio between angular movements as is desired. Thus the ratio here is 1 in 4 or in other words, for every degree of revolution of the cam lever the cam must revolve four degrees during the one-third sector of revolution where constant velocity is achieved.

The movement of lever 36 also causes arm 41 pivoting about point 33 to have a substantially constant angular velocity during this same period. Arm 41 is connected through parallelogram linkage 42 to an identical arm 43 which operates the one-way clutch 68 on output shaft 38, FIGURE 1a. When the lever 36 and arm 41 are experiencing constant angular velocity the clutch is activated thereby imparting constant angular velocity to the output shaft.

Depending upon the location of pivot point 33 the speed transmitted from the input shaft can be varied between zero and a maximum. However, it is necessary that the point be moved along the alignment formed by the pivot point 37 and the bisectrix of the angle formed by oscillatory motion of cam lever 36, this line being designated as 37–35. When the pivot point 33 is in the position shown in FIGURE 1, the arm 41 is equal in length to the length 37–33 and in this position represents the maximum amount of speed transmittable from the input to output shaft. In this position the angle A (34–33–35) is exactly double the angle B (34–37–35) for any position of lever 36. Since arm 41 moves at a constant speed when lever 36 does, its angular velocity will be exactly twice the angular velocity of the lever 36. As stated above, the lever 36 has a constant angular velocity equal to one-fourth of the angular velocity of the input shaft when the cam is rotating through the 120 degree sector of constant velocity. Thus the arms 41 and 43, through the parallelogram linkage, will move at a speed equal to twice the speed of lever 36 or one-half the speed of the input shaft. The motion of the arm 43 operates the one-way clutch 68 on the output shaft 38 and thus creates a maximum output speed equal to one-half the input speed.

It is to be noted that any one mechanism only acts on the output shaft during one-third of or 120 degrees of the revolution of the input shaft and that two other identical mechanisms dephased by 120 degrees to each other are needed to supply constant angular velocity to the output shaft during the full 360 degrees of revolution of the input shaft.

As the pivot point 33 is moved to the minimum position 33' as shown in FIGURE 1, then arm 41 will fall along the line 33'–37 with point 34 now being superimposed upon pivot point 37. Thus as the lever arm 36 oscillates around point 37, no movement in arm 41 will occur and thus no motion will be transmitted to the output shaft 38. These two points 33' and 33, as indicated in FIGURE 1, represent the minimum and maximum speeds transmittable from the input to the output shaft.

Because of the parallelogram linkage the pivot point 33 must move between the minimum and maximum positions at a constant distance from the axis of the output shaft 38 and therefore it must follow an arc between the two points. In addition, the relationship between the axis of the input shaft 30 and the pivot point 37 must be maintained and also the pivot point 33 must still be aligned with the line formed by the pivot point 37 and the bisectrix of the angle formed by the oscillating lever. Therefore, as the pivot point 33 is moved back along the arc 33–33' the pivot point 37 must move up along the arc 37–39, thereby maintaining a constant distance with respect to the axis 30, so that the bisectrix of the angle will still pass through the point 33. The two pivot points will meet at 39 and in this instant the angles A and B will be equal so that now one-fourth of the speed of the input shaft will now be transmitted to the output shaft. As the pivot point 33 moves further around the arc toward the minimum position the pivot point 37 will move back down the arc 37–39 to point 37 when point 33 reaches the minimum or zero speed position. FIGURE 8, which will be described later, relates to a mechanism for keeping these two pivot points in proper relationship with respect to each other and the input and output shafts.

With the pivot point 33 of the arm 41 at either extreme, no geometrical error in the constancy of the output speed is encountered nor at point 39. However, at intermediate position of 33 a slight error appears. Trigonometric analysis discloses that the error, expressed as the angle between the actual position of arm 43 and its ideal position should it revolve at perfect constant speed, is maximum for 33 at 60 percent to the right of 37, when lever 36 has turned 7.5 degrees from medium position. It amounts to .025 degree or 2.5 percent of one degree, which is insignificant and imperceptible.

This device therefore represents a vast improvement over the device described in U.S. Patent 2,929,255 as there the maximum constant velocity transmitted to the output shaft was 26.7 percent, whereas in this invention constant velocities of up to 50 percent of the input speed are transmitted.

FIGURE 2 shows a preferred embodiment of the motion transmitting device where fixed parts such as journals have been omitted. The input shaft 30 and the output shaft 38 are the only two pivots which are rigidly attached to the base of the machine. All other pivots can change position either functionally or when the speed ratio is modified. Parts already described are shown with the same reference numbers as previously used.

Point 34 of arm 41 is slidably mounted to lever 36 by attaching rollers 55 and 56 to the end 54 of the arm 41, pivoting around point 34. These rollers are mounted perpendicular to the plane of the paper and roll along the adjacent surfaces of the lever 36. In addition, hand wheel 45 is shown by which the speed ratio can be changed. It rotates screw 46 moving nut 47 axially to rotate the frame 48 around output axis 38, through a rod 69 and a crank 72 attached to pin 62, thus moving pivot point 33 between minimum and maximum positions. It should be noted that rod 42 of the parallelogram in FIGURE 2 is to the left of alignment 33–38, while it was on the right in FIGURE 1. The motion, however, of arm 43 is exactly the same as that described for the same arm in FIGURE 1, but the modification permits static balancing of the arm 41 around its pivot point 33 which balancing will be described more fully in the discussion of FIGURES 4, 5 and 6.

This type of construction permits double ends on both input and output shafts. By reversing the whole transmission end for end the direction of rotation of the output shaft is reversed at the loaded end and the user may select which position better fits his purpose. This reversal of rotation will require no changes in the positions of the input and output couplings if both shafts are in the same vertical plane dividing symmetrically the foundation holes in the base.

To maintain permanent contact between cam 31 and cam follower 32 the preferred method consists in adding to the active cam a reverse counter-cam 51 of identical design as cam 31. In FIGURE 3 the cam 31 is viewed from the front while the counter-cam 51 appears in the rear being mounted on the same input shaft 30. A counter-cam follower 52 is attached to an arm 53 which is rigidly secured to lever 36 and engages counter-cam 51 at all times. By placing the counter-cam exactly opposite to the cam 31, the cam follower 32 will touch cam 31 at its maximum radius at the instant cam follower 52 touches counter-cam 51 at its minimum radius and vice versa. With symmetrical speed variation of rotation of both cam levers and followers around their common pivot 37, as obtained from the cam profile hereinafter described in the discussion of FIGURE 7, it is seen that the distance between cam follower 32 and follower 52 is constant for all positions of the cams. If this distance is maintained by the rigidity of the fork 36–53 no separation will occur between any cam and its follower. In fact, by presetting internal stresses in the fork, pressure will be created between each cam and its follower to suppress any tendency for a separation due to external stresses resulting, for instance, from inertia forces in each fork at high speed.

To construct a mechanism free from vibrations due to inertia forces, it is necessary to dynamically balance the machine which means that there can be no accelerations in any moving parts. Such accelerations can be both linear and rotary. Linear accelerations are easily eliminated in the case of rotation or oscillation around a fixed axis by bringing the center of gravity of the moving parts to their respective axes of motion. Thus, since the cams and counter-cams are rotating at constant speeds there is no rotary acceleration but only linear and dynamic balance can be achieved by using suitable rotary counterweights 58 and 59 as shown in FIGURE 4. These counterweights are placed in the plane of rotation of the cam sufficiently out of the way of the path of the cam followers in order to bring the center of gravity of a pair of cams onto the input shaft axis 30. In this figure counter 58 balances cam 31 while counterweight 59 balances cam 51 about the axis of the input shaft 30. For oscillating masses such as levers 36, linear accelerations are removed by counterweights on each member to bring the center of gravity of each lever to its pivot point such as counterweight 70 on levers 36 and 53 and counterweight 71 on lever 43 also acting on lever 41 (FIGURE 1a).

However, rotary accelerations which may develop in moving parts can only be compensated by equal accelerations in oposite directions. Thus, the cams have been designed not only to provide constant speed to the output shaft for every setting of the speed ratio but have also been designed to insure perfect dynamic balance in the machine. The cams are so constructed that the rotary accelerations of the cam levers are compensating of each other provided that three mechanisms are considered simultaneously and each is properly dephased from one another. In FIGURE 5 there is shown the speed of a cam lever 36 as it follows the cam profile through three adjacent 120 degree sectors during one full revolution of the cam and input shaft. During the first 120 degree sector of the cam, as shown in FIGURE 5, the angular speed of rotation of lever 36 is constant. Because the lever moves one degree for every four that the cam moves, the lever will rotate through an angle of 30 degrees while it is in constant velocity.

During the second sector of 120 degrees the angular speed of lever 36 varies linearly with time, dropping from the constant value of the first sector to a zero speed at approximately 165 degrees on the graph, this being the point where the cam follower 32 has reached its uppermost position as shown in FIGURE 1. The lever then reverses and gains speed in the reverse direction to a value substantially twice the original constant speed at 240 degrees on the graph. As herein noted, only the first 120 degree sector is active in moving the output shaft by suitable linkage, for when the speed of the lever begins to decrease in the second sector, a second lever from a dephased mechanism has now taken over operating its own clutch on the output shaft. Since the clutches are one-way clutches there will be no effect on the output shaft when the lever accelerates in the opposite direction. In the third sector an additional mechanism is operating until the first sector of constant velocity of the first mechanism is again reached.

As shown in FIGURE 5, the transition between the first and second sectors is accomplished by a short curve which could be an arc of a circle of any radius or any other curve or even a sharp corner. At the end of this second sector, an identical transition curve is used to bring the speed to constancy, momentarily, for easier junction between the second and third sectors. During the next and last 120 degree rotation of the cam, to complete a full turn of the input shaft, the speed of lever 36 retraces the same variation as in the second sector reducing lineraly until zero at approximately 315 degrees on the graph reversing the growing lineraly until reaching the constant portion of the curve of the first sector.

Figure 6:
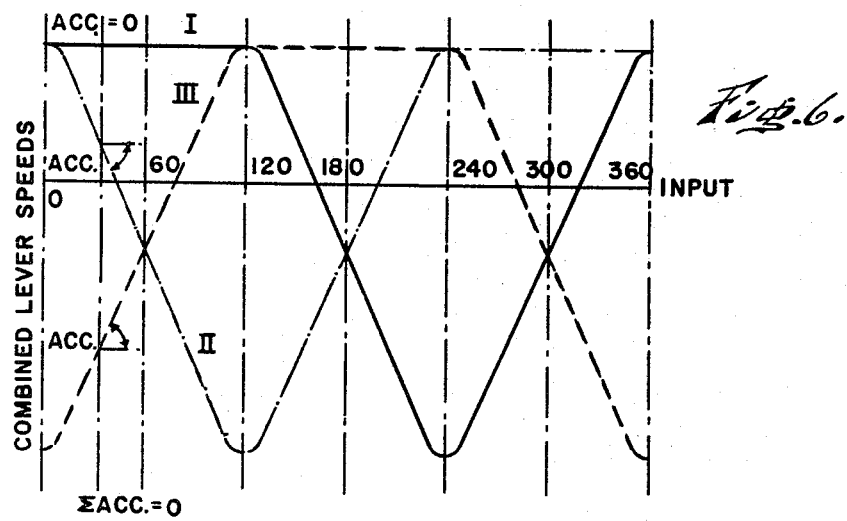
FIGURE 6 is a plot of the angular speed of the cam follower levers of three combined motion transmitting devices connected to a common output shaft each device being dephased 120 degrees from each other with the speed of the levers being plotted against the degrees of revolution of the input shaft.

When three dephased mechanisms are used for the transmission of speed the plot of the speed curves for each mechanism can be shown as in FIGURE 6. Here cam I is active giving constant velocity during the first sector. At the end of this sector cam III has reached the position of constant velocity and this takes over until the mechanism of cam II produces constant velocity in the last or third sector. Thus, for any angle of rotation of the cams, which are all attached to the same input shaft, it is seen that in any mechanism which is then actively transmitting motion to the output shaft, that its lever is moving at a constant speed and thus there is no rotary acceleration. However, for the other two mechanisms then in inactive motion, their levers are accelerating and such can be measured by the slope of the speed curve in FIGURE 6. Since there is equality of slope but opposition of sign, it does not matter that at any one time both mechanisms may have different speeds or unrelated motions, it is sufficient that their accelerations compensate each other to avoid inertia forces acting on the machine as a whole. Thus, the sum of the accelerations at any one point will always be equal to zero as shown in FIGURE 6.

Since the arms 41 and 43 and with them rod 42 have angular motions and speeds close to those of levers 36, their rotary accelerations also compensate to zero as well as their combined inertia forces provided that they first statically balanced about pivots 33 and 38 respectively to prevent imbalance from linear acceleration.

Sufficient rigidity in the input shaft itself will be needed to prevent elastic torsion or bending of the same. Additional bearings are recommended between the three mechanisms to improve rigidity of the shaft.

Since the total motion of lever 36 is nil after one full revolution of the cam, the integral of the speed curve of FIGURE 5 must be zero. The zero reference line of this curve must therefore be such that the areas under the positive portions of the curve are equal to the negative area. It is found geometrically that this zero reference line locates itself down from the top by one-third of the spread of speed variation.

In designing the cam profile to satisfy all the requirements, the cam is divided into 360 degree with three adjacent 120 degree sections as noted above. In tracing the profile of the cam the speed curve is integrated from 60 to 240 degrees as shown in FIGURE 3, and the angular displacements of lever 36 between these limits of degrees are shown in the following table:

TABLE I

| Angle of cam rotation, deg. | Angular displacement of lever 36, deg. |
|---|---|
| 60 | 0 |
| 65 | 1.25 |
| 70 | 2.5 |
| 75 | 3.75 |
| 80 | 5 |
| 85 | 6.25 |
| 90 | 7.5 |
| 95 | 8.75 |
| 100 | 10 |
| 105 | 11.25 |
| 110 | 12.5 |
| 115 | 13.75 |
| 120 | 15 |
| 125 | 16.09298 |
| 130 | 17.18532 |
| 131.69252 | 17.557339 |
| 137.7944 | 18.80085 |
| 142.7944 | 19.61816 |
| 147.7944 | 20.25385 |
| 152.7944 | 20.70791 |
| 157.7944 | 20.98035 |
| 162.7944 | 21.07116 |
| 167.7944 | 20.98035 |
| 172.7944 | 20.70791 |
| 177.7944 | 20.25385 |
| 182.7944 | 19.61816 |
| 187.7944 | 18.80085 |
| 192.7944 | 17.80191 |
| 197.7944 | 16.62135 |
| 202.7944 | 15.25916 |
| 207.7944 | 13.71535 |
| 212.7944 | 11.98991 |
| 217.7944 | 10.08285 |
| 222.7944 | 7.99416 |

TABLE I—Continued

| Angle of cam rotation, deg. | Angular displacement of lever 36, deg. |
|---|---|
| 228.30748 | 5.48062 |
| 230 | 4.68547 |
| 235 | 2.34313 |
| 240 | 0.00015 |

These displacements are then plotted above the median circle centered on the input shaft axis from 60 to 240 degrees counterclockwise and below the median circle from 60 to 240 degrees clockwise. See FIGURE 7. As standard practice in cam tracing, the cam is stationary with the cam follower revolving around it. The successive positions of pivot 37 are traced around the circle in FIGURE 7 as well as the positions of the center of cam follower 32. By tracing a portion of a circle around such positions of the diameter of the cam follower, the cam profile can be drawn as a curve tangent to all these circles.

From the cam profile layed out in FIGURE 7, the first 120 degree sector labeled I represents the active area where constant velocity is imparted to the lever 36. In the second 120 degrees of revolution of the cam, the lever following the cam profile in the area designated as II will decrease in velocity to zero and then increase to a maximum speed in the reverse direction. In the last 120 degrees of revolution the lever will move according to the profile of the cam designated as area III. Here it will decrease in velocity from maximum to a zero value, then increase back up to the constant velocity achieved in the first sector. The plot of FIGURE 5 shows this variation in velocity during one revolution of the cam.

In FIGURE 8 and FIGURE 1a there is depicted a system for adjusting pivot point 37 to the proper relationship with respect to pivot point 33 as it is moved along the arc between minimum and maximum positions. Superimposing FIGURE 8 on to FIGURE 2 it is seen that plate 60 is rigidly attached to plate 48 by means of circular connecting posts 61 and 62 integrally attached to each plate and shown here in cross section. Likewise, plate 63 is integrally attached to plate 49 by means of connecting posts 64 and 65 also shown in cross section. The plates 48 and 60 rotate about the output shaft 38 and plates 49 and 63 rotate about the input shaft 30. The two plates 60 and 63 are interconnected by a rod 66 which is pivotally connected to each plate. Connecting rod 66 pivots about point 67 on plate 63 which pivot point is in alignment with pivot point 37 on plate 49. The other end of the rod 66 is pivotally connected to a suitable point on plate 60, said point being the center of the circular path of pivot 37 relative to the plate 60.

As the plate 48 is rotated about the output axis 38 thus traversing pivot point 33 across the arc, see FIGURE 2, plate 60 rotates simultaneously therewith because of the connecting posts 61 and 62. As plate 60 rotates it also rotates plate 63 about its axis because of the connecting rod 66. As plate 60 moves counterclockwise, plate 63 will move clockwise. Because of the connecting posts 64 and 65, this in turn will rotate plate 49 in a clockwise direction. On one end of this plate 49 is pivotally mounted the lever 36 at point 37 so that as plate 49 travels in a clockwise direction the pivot point 37 will traverse the arc 37–39, see FIGURE 2. Thus, when the pivot point 33 reaches the point 39, pivot point 37 has also reached the same point by reason of the linkage shown in FIGURE 8. As pivot point 33 moves further around the arc by rotating plate 48 in a counter clockwise direction, plate 63 will then begin to turn in a counterclockwise direction because the connecting link 66 has passed the midpoint. This will bring pivot point 37 back down the arc 37–39 to its original position.

In view of my invention and disclosure variations and modifications to meet individual whim or particular need will doubtless become evident to others skilled in the art to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. A variable speed mechanical motion transmitting device for producing from an input shaft rotating at a constant speed a substantially constant angular output speed over at least one-third of a revolution of the input shaft, said constant output speed being adjustable between zero and at least 50% of the input speed, comprising an input shaft, a cam attached to the input shaft, a cam lever pivoting about a first axis remote from the axis of the input shaft, a cam follower mounted on the end of said lever and rolling in continuous contact with said cam, said cam creating a constant angular velocity in the lever during one-third of a revolution of the cam and varying linearly the angular velocity of the lever in each of the second third and the last third of one revolution of the cam, said linear variation being reversed in the last third of the revolution with respect to the linear variation in the second third of one revolution, a first arm slidably mounted on said lever and rotating about a second axis, said second axis being adjustable in position with respect to said first axis along the alignment of the first axis and the bisectrix of the angular movement of the lever, an output shaft, an output arm rotatable around the output shaft, linkage for maintaining the output arm constantly parallel to said first arm, a one-way clutch mounted on the output shaft, said clutch being acted upon by the output arm during the one-third revolution of the cam where constant angular velocity of the lever is achieved, a counter-cam identical in design with the cam, said counter-cam being mounted reverse to the cam on said input shaft, a counter-cam lever integrally connected to said cam lever, and a counter-cam follower rolling in continuous contact with said counter-cam and mounted upon the end of said counter-cam lever, one of said followers rolling on the maximum radius of its associated cam while the other is rolling on the minimum radius of its associated cam, thereby maintaining permanent contact between the cams and the cam followers in all positions of input revolution.

2. A variable speed device of claim 1, including counterweights for each cam and counter-cam, said counterweights rotating in the same plane as the cams so as to bring the center of gravity of the combined cam and counterweight to the axis of the input shaft thereby achieving static balancing of each cam.

3. A variable speed device of claim 2, comprising additional counterweights for said arms and levers so as to bring the center of gravity of each arm and lever to their respective pivoting axes to thereby achieve static balancing of these oscillating arms and levers.

4. A variable speed transmission device comprising three variable speed mechanical motion transmitting devices for producing from an input shaft rotating at a constant speed a substantially constant angular output speed, said constant speed being adjustable between zero and at least 50% of the input speed, each of said mechanical motion transmitting devices comprising an input shaft, a cam attached to the input shaft, a cam lever pivoting about a first axis remote from the axis of the input shaft, a cam follower mounted on the end of said lever and rolling in continuous contact with said cam, said cam creating a constant angular velocity in the lever during one-third of a revolution of the cam and varying linearly the angular velocity of the lever in each of the second third and the last third of one revolution of the cam, said linear variation being reversed in the last third of the revolution with respect to the linear variation in the second third of one revolution, a first arm slidably mounted on said lever and rotating about a second axis, said second axis being adjustable in position with respect to said first axis along the alignment of the first axis and the bisectrix of the angular movement of the lever, an output shaft, an output arm rotatable around the output shaft, linkage for maintaining the output arm constantly parallel to said first arm, a one-way clutch mounted on the output shaft, said clutch being acted upon by the output arm during the one-third revolution of the cam where constant angular velocity of the lever is achieved, each of said mechanical cams being mounted successively on the input shaft and out of phase with one another by 120 degrees, thereby allowing each mechanism to successively impart constant angular velocity to the output shaft during the particular one-third of a revolution of the motion transmission device's associated cam wherein constant angular velocity of the cam lever is achieved, wherein two cam levers at any instant during rotation of the input shaft have equal but opposite angular accelerations while the third cam lever is rotating at constant angular velocity, thereby achieving dynamic balance in the said device.

References Cited

UNITED STATES PATENTS

| | | | |
|---|---|---|---|
| 954,987 | 4/1910 | Morgan | 74—119 |
| 2,706,914 | 4/1955 | Spence | 74—119 |
| 2,929,255 | 3/1960 | Colinet | 74—119 |

FOREIGN PATENTS

| | | |
|---|---|---|
| 916,047 | 8/1946 | France. |
| 343,558 | 4/1921 | Germany. |
| 249.888 | 3/1927 | Sweden. |

FRED C. MATTERN, Jr., *Primary Examiner.*

W. S. RATLIFF, *Assistant Examiner.*